(12) United States Patent
Mees et al.

(10) Patent No.: US 6,347,712 B1
(45) Date of Patent: Feb. 19, 2002

(54) FILTER

(75) Inventors: Harald Mees, Lebach; Michael Sakraschinsky, St. Ingbert, both of (DE)

(73) Assignee: Hydac Filtertechnik GmbH, Sulzbach (DE)

( * ) Notice: Subject to any disclaimer, the term of this patent is extended or adjusted under 35 U.S.C. 154(b) by 0 days.

(21) Appl. No.: 09/142,849

(22) PCT Filed: Mar. 21, 1997

(86) PCT No.: PCT/EP97/01423

§ 371 Date: Sep. 17, 1998

§ 102(e) Date: Sep. 17, 1998

(87) PCT Pub. No.: WO97/37743

PCT Pub. Date: Oct. 16, 1997

(30) Foreign Application Priority Data

Apr. 6, 1996 (DE) .......................... 196 13 847

(51) Int. Cl.⁷ .................. B01D 27/06; B01D 27/08; B01D 35/34
(52) U.S. Cl. .................. 210/440; 210/450; 210/455; 210/493.2; 210/497.01
(58) Field of Search .................. 210/440, 450, 210/455, 457, 493.1, 493.2, 497.01; 55/202

(56) References Cited

U.S. PATENT DOCUMENTS

| | | | | |
|---|---|---|---|---|
| 3,095,290 A | * | 6/1963 | Hockett | 55/502 |
| 4,128,251 A | * | 12/1978 | Gaither et al. | 55/502 |
| 4,186,099 A | * | 1/1980 | Hanschel, Jr. et al. | 210/457 |
| 5,399,264 A | * | 3/1995 | Pulek et al. | 210/493.2 |
| 5,584,987 A | * | 12/1996 | Mules | 210/450 |
| 5,685,985 A | * | 11/1997 | Brown et al. | 55/502 |

FOREIGN PATENT DOCUMENTS

| | | | | |
|---|---|---|---|---|
| EP | 0547291 | | 6/1993 | |
| FR | 2214505 | * | 9/1974 | 210/493.1 |
| WO | 9615841 | | 5/1996 | |

* cited by examiner

*Primary Examiner*—Matthew O. Savage
(74) *Attorney, Agent, or Firm*—Roylance, Abrams, Berdo & Goodman, L.L.P.

(57) ABSTRACT

A filter with a multi-piece filter body has a filter head connected to a filter pot and has at least one filter element. The filter element has a support tube surrounded by a filter mat. The filter mat free ends have element mountings. One of the element mounting is rigidly connected to the support tube and can be placed in contact with the filter head. An intermediate member is arranged, at least at that end of the filter element mounting connected to the filter head, between that element mounting and that end of the filter mat, and can be removed along with the filter mat from the support tube which remains connected to the filter head. Axial support of the end caps of the cylindrical filter element is achieved in that a possible fluid passage point, in particular a gap which can be closed after the start of operation by the resulting fluid differential pressure, is provided in the axial mounting direction at least between one part of the intermediate members and the associated filter element mounting, when a filter mat is mounted on the support tube, providing reliable control also of high differential pressures.

19 Claims, 5 Drawing Sheets

FILTER

FIELD OF THE INVENTION

The present invention relates to a filter with a filter housing formed of multiple parts, including a filter head connectable with a filtering pot. The housing receives at least one filter element including a support tube surrounded by a filter mat provided at its free ends with filter element mountings. At least one of the filter element mountings is connected securely with the support tube and can be brought into contact with the filter head. At least at the end of the filter mat which has the filter element mounting connected with the filter head, an intermediate spacing member is arranged between this filter element mounting and this end of the filter mat. The intermediate spacing member can be removed together with the filter mat from the support tube, which remains connected with the filter head.

BACKGROUND OF THE INVENTION

Filters, as disclosed EP 0 547 291 A, serve mainly to decontaminate contaminated fluid, especially hydraulic oil, by removing the contaminants. For this purpose, the contaminated fluid passes through an inlet opening into the filter arrangement and flows through the filter from the exterior to the interior. The filter mat is supported on the support tube constructed in the form of a hollow cylinder with apertures. The contaminants remain in the filter mat, and the fluid cleansed of its contaminants is discharged from the filter arrangement through a discharge opening. If the filter mat is obstructed by the contaminants, which can be determined generally by a rise of the differential pressure, then, with the conventional arrangements, the filter must be exchanged for a new filter.

For the exchange of the filter element, the filtering pot is unscrewed from the filter head and the filter mat obstructed with contaminants is exchanged for a new one. The contaminated filter mat is removed from the support tube along with its intermediate spacing member, while the support tube remains on the filter head, together with the associated filter element mounting. The costs involved in a filter mat exchange are thus reduced and the environment is less contaminated in the process, since the filter mats in question are recyclable without further treatment.

With very high fluid differential pressures, however, problems arise in these conventional arrangements in the area of the filter element mounting, because of the low support forces present at that point. The low support forces can lead to failure of the entire filter arrangement. The effectiveness of the sealing in the vicinity of the mounting can be reduced and leakage cannot be avoided. Furthermore, there is the possibility of impacting or buckling of the filter assembly with the drawbacks which that entails.

SUMMARY OF THE INVENTION

Objects of the present invention are to provide a filter arrangement that avoids the aforementioned drawbacks in conventional filter arrangements.

The foregoing objects are basically attained by a filter arrangement having a multi-part filter housing, a filter element, first and second filter element mountings, a first intermediate spacing member, and a first axial gap extending between the first intermediate spacing member and the first filter element mounting. The filter housing includes a filter head detachably coupled to a filter pot. The filter element includes a support tube surrounded by a filter mat, with the mat being open at opposite first and second ends. The filter element mountings are mounted on the respective ends of the filter mats. The first filter element mounting is securely connected with the support tube and contacts the filter head. The intermediate spacing member is coupled to filter mat first end, is removable with the filter mat from the support tube when the support tube remains connected with the filter head, and is mounted between the filter mat first end and the first filter element mounting. The axial gap forms a first possible fluid passage point at the first filter element mounting, which gap is closed by fluid differential pressure generated after operation start-up of the filter arrangement.

Closing the gap by the resulting fluid differential pressure following the start-up of operation provides axial support of the end caps of the cylindrical filter element and guarantees that the high differential pressures are overcome. Furthermore, following closing off of this possible fluid passage point by means of the prebiasing or preloading caused by the fluid differential pressure, higher quality sealing occurs in the vicinity of the filter mounting, so that leakage is avoided. With sufficient prebiasing of the filter assembly, the gap can be deleted, while a theoretical passage point nonetheless remains.

The filter mats which are used can be produced either with or without supporting meshing made of simple paper elements. Higher quality support elements incorporate a multi-layer mat construction made up of a variety of materials. The filter mat can also be designed to be pleated.

In one preferred embodiment of the filter arrangement according to the present invention, the prebiased filter element mounting connected with the filter head is an integral component part of the filter housing or with radial prebiasing can be moved forward onto an interior support of the filter head. With the integrated arrangement, the filter element mounting turned toward the filter head together with the support remains in any case on this member. With forward movement of the filter element mounting on an associated interior support of the filter head, the filter element mounting is detachably connected with the filter head and can be removed together with the support tube. An O-ring, which is prebiased between interior supports of the filter head and the filter element mounting, can serve to produce the raidal prebiasing.

In another preferred embodiment of the filter arrangement according to the present invention, the intermediate spacing member, arranged between the end of the filter mat and the filter element mounting connected with the filter housing, overlaps this filter mat end in a cap-like manner. The intermediate spacing member is detachably connected with the filter element mounting, preferably by means of a clamp ring. In this manner, the intermediate spacing member, either additionally or alternately in an axial mounting arrangement, has an elastically flexible sealing, which can be brought into contact with the filter element mounting. In this configuration, after release of the clamping ring, the filter mat together with the intermediate spacing member can be removed from the filter element mounting and the support tube.

In another preferred embodiment of the filter arrangement according to the present invention, the filter element mounting connectable with the filter head incorporates cam drive elements, which can be brought into contact with the filtering pot under the effect of an outside power source. With smaller relative movement of the filter element relative to the filtering pot, and with simultaneous screwing up and down of the filtering pot, the filter element can be removed from the filter housing or inserted therein. Insofar as the aforementioned cam drive elements are part of at least one intermediate spacing member, the filter element mounting in turn can remain with the support tube in the housing. Only the filter mat is removed with the intermediate spacing members connected with it.

Preferably, in this manner, the end of the filter element remote from the filter head is closed off by a filter element mounting constructed of a plurality of parts. The associated intermediate spacing member then surrounds it in a cap-like arrangement. Preferably, the intermediate spacing members can in turn be caught and held together with the associated filter element mounting by means of a catch connection.

In one further preferred embodiment of the filter arrangement according to the present invention, a power source is inserted between support tube and filter head of the filter housing, usually in the form of a tension or compression spring. Another power source is located, preferably between the filter pot and the filter element, and is usually a compression spring, working on the filter element mounting remote from the filter head. In this manner, even during increasing compression or impacting stress on the filter element, impacting or thrust-driving of the exchangeable filter element to be inserted in axial alignment can be prevented, which if necessary for the exchange would lead to damage.

The present invention furthermore relates to a filter element for use in a filter arrangement as described above, wherein the filter mat is configured as a hollow cylinder with an intermediate spacing member mounted on at least one end. Together with the filter mat, the intermediate spacing member can be removed or can be moved forwardly by sliding onto a support tube. The filter, designed and constructed as a modular element, can thus be used again together with the support tube and the filter element mounting. When the filter material becomes obstructed by contaminants, the depleted hollow cylindrical filter need simply be exchanged for a new one in a manner which is low cost and environmentally safe.

As a result of the arrangement having the support tube closed off at the bottom end in connection with an elastic end cap or in connection with a catch arrangement or limiting boss arrangement for the end cap, a rigid support in axial alignment is obtained. Especially at high pressures, it guarantees reliable function of the filter arrangement.

Other objects, advantages and salient features of the present invention will become apparent from the following detailed description, which, taken in conjunction with the annexed drawings, disclose preferred embodiments of the present invention.

BRIEF DESCRIPTION OF THE DRAWINGS

Referring to the drawings which form a part of this disclosure.

DETAILED DESCRIPTION OF THE PREFERRED EMBODIMENTS

Figure 1:
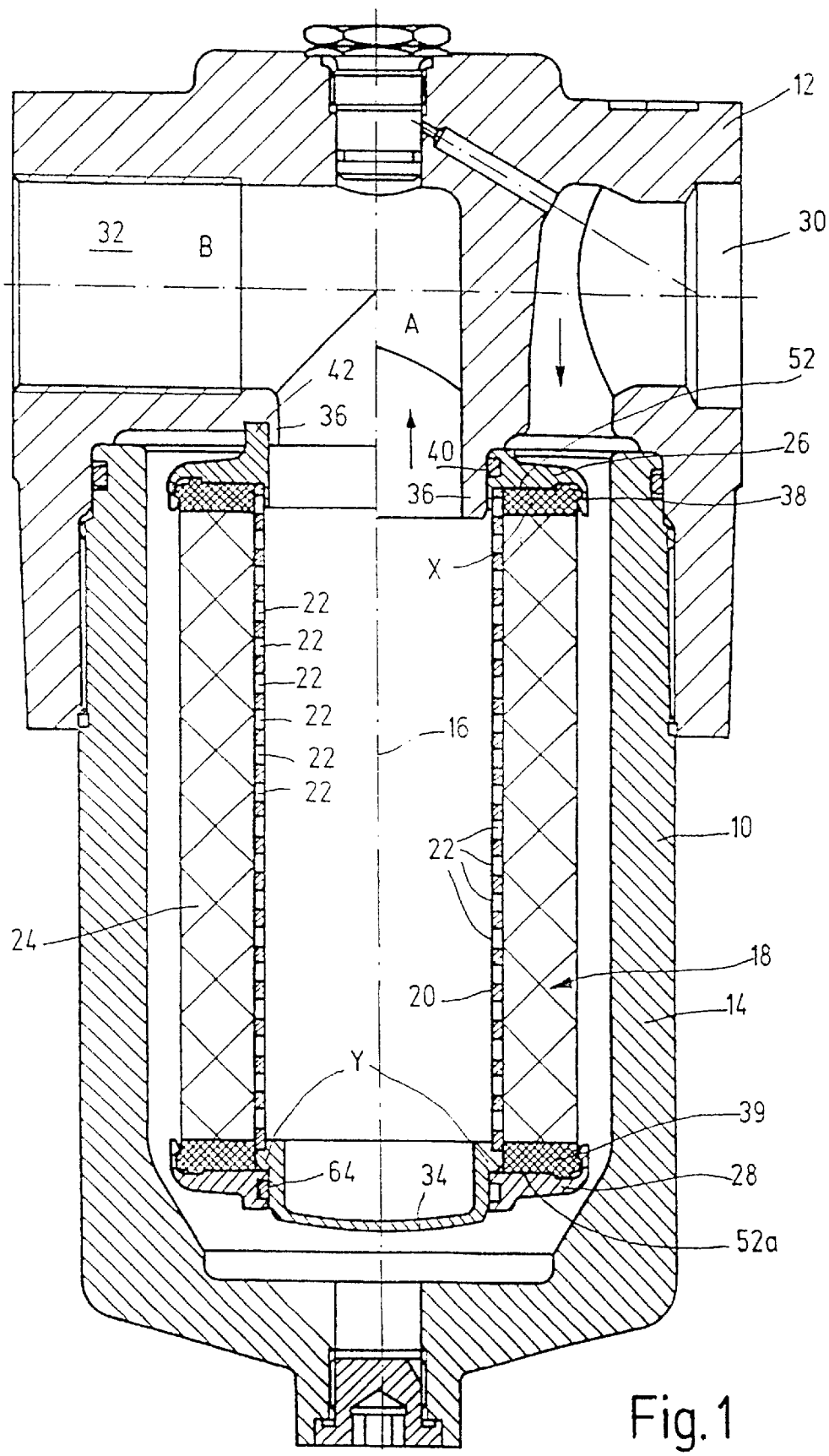
FIG. 1 is side elevational view in section of a filter arrangement according to a first embodiment of the present invention.

The filter arrangement shown in FIG. 1 has a two-part filter housing 10 with a filter head 12 arranged at the top and a filter pot 14 thereunder. Filter pot 14 can be screwed or threaded into filter head 12 by means of its exterior threading. Within filter pot 14 and in coaxial alignment with the longitudinal axis 16 of filter housing 10, a filter element 18 is arranged. Filter element 18, constructed in this case is essentially a hollow cylinder, which for example can be made up of a pleated filter mat, and has a plastic or metal support tube 20 in its interior with apertures 22. Support tube 20 is surrounded by a filter mat 24, provided on its free ends with filter element mountings 26 and 28.

An inlet and an outlet 32 in filter head 12 serve for the intake of the contaminated liquid and the discharge of the decontaminated liquid from the filter arrangement, respectively. The flowthrough direction within filter housing 10 is shown by the arrows in FIG. 1. The liquid to be decontaminated consequently passes through filter element 18 from the outside to the inside, through filter mat 24 and apertures 22 of support tube 20. Thus, filter mat 24 retains the contaminants in the filter element made of woven material. Support tube 20 is open at its end closer to or adjacent to filter head 12, and is closed off at its other end by a base 34.

Figure 2:
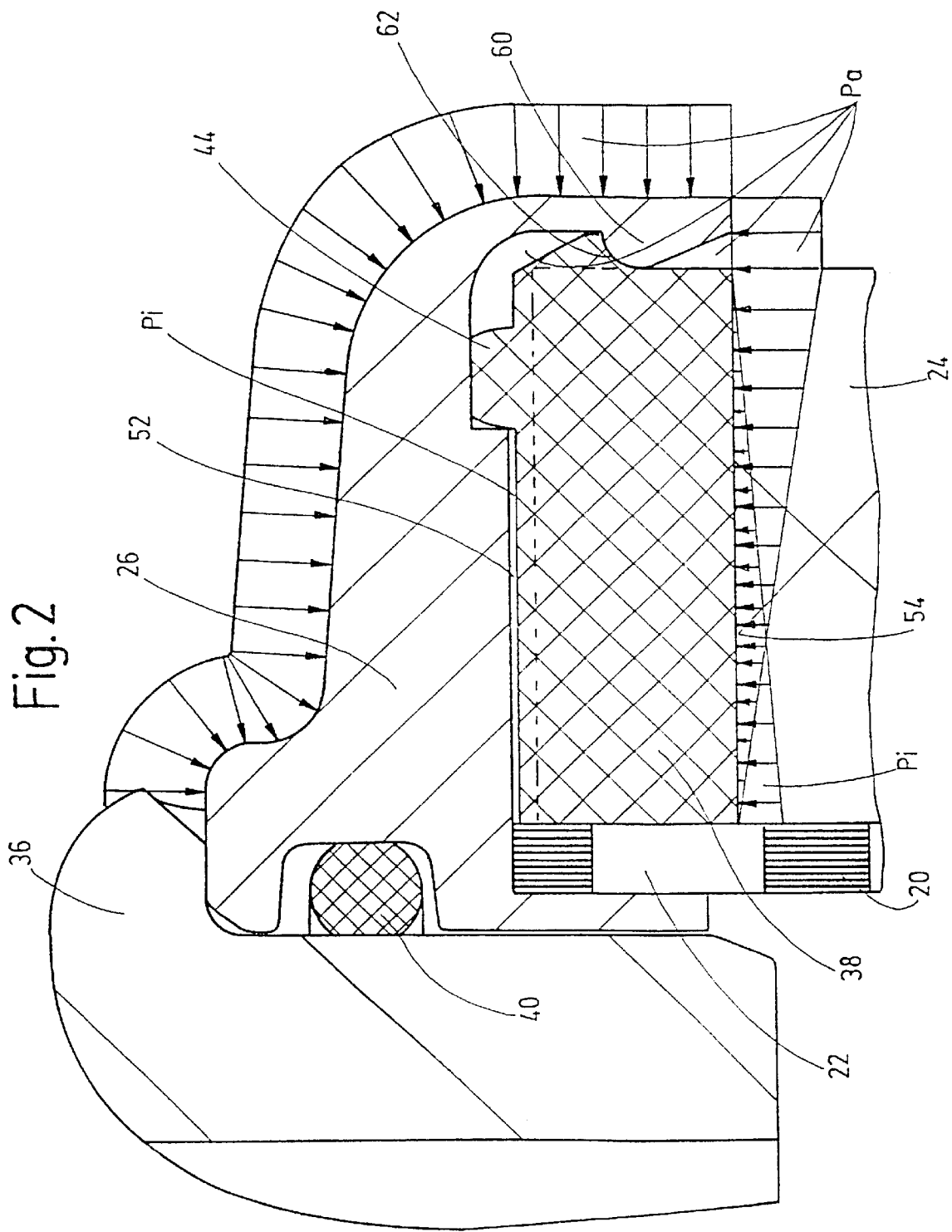
FIG. 2 is an enlarged, partial side elevational view in section of the part of filter arrangement, indicated with "X" in FIG. 1.

The filter element mounting 26 shown at the top in FIG. 1 is connected securely with the open end of support tube 20 in the vicinity of its opening, and contacts internal support 36 of filter head 12. To the right and left of longitudinal axis 16, two different constructions for filter element mounting 26, as well as associated internal support 36 are illustrated and are more fully described hereinafter. Between the end of filter mat 24 and annular filter element mounting 26 an annular intermediate spacing member 38, shown in detailed in larger scare in FIG. 2, is illustrated. Spacing member 38, in a cap-like manner overlaps and surrounds the top open end of filter mat 24 around its top edge.

This intermediate spacing member 38 engages on the working surface at the open end in the top area of filter mat 24 and is connected securely with the filter mat, for example by means of an adhesive connection or the like. Filter element mounting 26, in the form shown to the right in FIG. 1, has an internal sealing ring or gasket 40 extending in a groove in filter element mounting 26. In this form, filter element 18 is held by radial clamping onto the associated internal support 36 of filter head 12.

In the form of top filter element mounting 26 shown to the left in FIG. 1, a flange-like central fillet 42 is connected in an associated groove of filter head 12, engaging and being an integrated component part of filter head 12. Since the radial sealing gasket of the left side form can be deleted in this construction, the flow parameters indicated with "A" can be enlarged. For the purpose of flow-favorable guiding, the flow parameters indicated with "B" can be made identical to the flow parameters "A".

As shown in the larger scale illustration of FIG. 2, representing the section "X" in FIG. 1, intermediate spacing member 38 forms a seal by means of an annular foamed or embedded sealing ring 44 (FIG. 2). Ring 44 projects outwardly on the top and on the exterior of the periphery of intermediate spacing member 38. This sealing ring 44 can be prebiased by means of a clamping ring or the like, which engages a ring contact surface extending parallel to the longitudinal axis 16 on the interior periphery both in intermediate spacing member 38 and also through an associated groove in filter element mounting 26, which in turn can be mounted securely by means of its central fillet 42 on filter head 12. The top of filter mat 24 is secured to the bottom of intermediate spacing member 38 by an adhesive layer 54, as shown in FIG. 2.

With the construction of a filter element mounting of FIG. 2, rigid axial support is realized to withstand high differential pressures. The axial support is undertaken through end cap 26 and not as in the state of the art, where the insertion of the filter element normally also undertakes the support of axial forces. Therefore, a prebiased axial sealing is provided over the gap 52. The pressure ratios on the filter element generated during filter operation are shown graphically in FIG. 2 with Pi and Pa, whereby Pi represents the internal pressure within the filter element and Pa represents the external fluid pressure. Enhancement of the prebiasing and a tighter sealing by closing gap 52 with rising differential pressure, $\Delta P = Pa - Pi$, is attained solely by means of the fluid pressure from the fluid medium impacting on intermediate spacing member 38 and filter element mounting 26. As a result of the arrangement of flexible sealing ring 44 on the external edge of the filter unit, intermediate spacing member 38 can be pressed by external pressure against filter element mounting 26 upon closing off of gap 52. Increased sealing effect is obtained as a result of this prebiaising. As a result of the axial support of filter element mounting 26, no axial forces are transmitted onto the filter unit.

Figure 3:
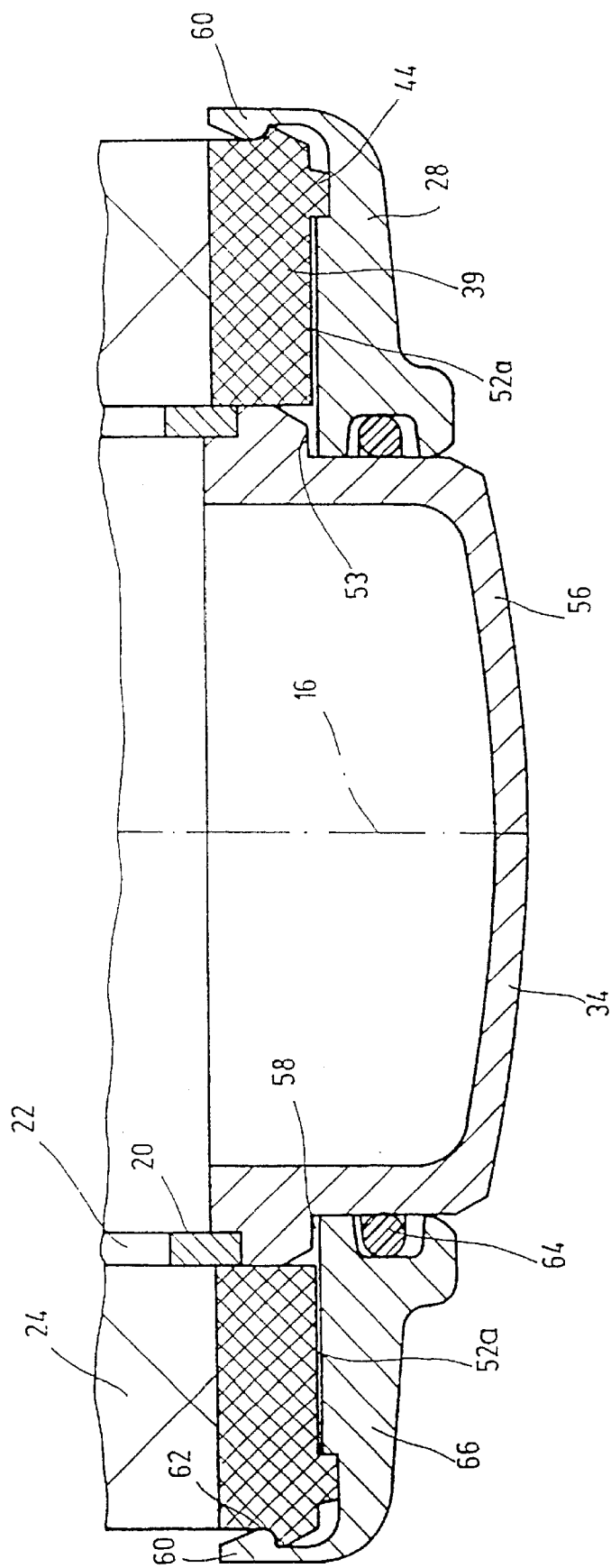
FIG. 3 is an enlarged side elevational view in section of the part of the filter arrangement indicated with "Y" in FIG. 1.

As shown in FIGS. 2 and 3, a resulting radial gap 52a can also be arranged on the opposite end of filter 18. As a result of this arrangement, the relevant intermediate spacing members 38 surround support tube 20 around its external periphery in the vicinity of its open ends. Furthermore, a projecting click-catch 60 is arranged on the open end of each one of the filter element mountings 26 and 28. Each catch 60 engages by catching on an associated catch notch 62 on both of the intermediate spacing members 38 and 39 to produce a catch connection between these structural parts. Insofar as filter element mountings 26, 28 are formed of an elastic, flexible synthetic resin or the like, the resulting click-catch or other catch connection can be released manually without any other action. As especially shown in FIG. 3, bottom filter element mounting 28 is configured of two parts. A cover part 56 forms base 34 and is in contact through another sealing ring 64 adjacent to filter element mounting 66 and in sealed connection therewith.

For the exchange of filter elements, first of all filter pot 14 is screwed off of filter head 12. After detachment of the security or clamping ring, filter mat 24 with bottom filter element mounting 28 and intermediate spacing member 38 are all manually withdrawn from the outside of support tube 20. Support tube 20 extends over the top filter element mounting 26, and remains connected with filter head 12 as another component part of filter housing 10. A newly inserted filter mat 24 can then be slipped over support tube 20 and over the clamping ring connected with top filter element mounting 26. Following screwing of filtering pot 14 into filter head 12, the filter is ready for a new filtering procedure.

In the embodiment of FIG. 1, intermediate spacing members 38 and 39 are mounted at the two open ends of filter mat 24, and the rings arranged on filter mat 24 can be of foamed material. Intermediate spacing members 38 and 39 particularly can be of polyurethane or silicon foam, but a rubber elastic material would likewise be conceivable. In FIG. 1, top and bottom, the two annular intermediate spacing members 38 and 39 are surrounded by cap-like filter element mountings 26 and 28. Especially as seen in FIGS. 2 and 3, a certain degree of play is present in the form of annular gaps 52 and 52a, on the working side between the surfaces of intermediate spacing members 38 and 39 and filter element mountings 26 and 28 which are turned toward one another, insofar as the filter is not in operation. Gap 52 or 52a is not closed by the fluid differential pressure being generated until operation is assumed, whereby the total pressure ranges is obtained, as seen in FIG. 2, by the differential pressures Pi and Pa impacting on the bottom of intermediate spacing member 38 and running in wedge configuration on the other side.

When filter element 18 is constructed with its shortest length, bottom filter element mounting 28 contacts a flange-like limiting boss 53 which is part of the overturned and thrust-forward cover part 56. Cover part 56 closes off support tube 20 at the bottom and in this case is part of the multi-part bottom filter element mounting 28. Bottom annular gap 52a is retained. When the filter reaches its greatest length, a gap 58 occurs between limiting boss 53 and bottom filter element mounting 28. The gap does not exceed double the axial length of bottom annular gap 52a. If filter element 18 in turn is acted upon with external excess pressure upon start-up of the filter operation, which corresponds for example to the pressure differential $\Delta P$ with a contaminated filter mat 24, then, with a filter mat 24 having the smallest dimensions, as aforementioned, the axial force of bottom filter element mounting 28 is introduced directly through limiting boss 53 in cover part 56 of bottom filter element mounting 28 and finally further through this cover part into support tube 20. With use of a filter mat 24 having the largest dimensions, the axial force of bottom filter element mounting will further deform the two sealing beads or rings 44 of the filter mat 24, until annular gaps 52, 52a are closed top and bottom, and bottom filter element mounting 28 contacts the limiting boss 53. Therefore, excess axial forces are in turn carried off through support tube 20. The loads or charges on filter mat 24 can then be minimized in the axial direction. With an element exchange, all of the parts of the element exchange unit could be reused.

The following embodiments of the filter arrangement are explained only insofar as they differ notably from the embodiment of FIG. 1 in this description. Identical structural parts are indicated with the same references, but increased by 100 for the second embodiment and by 200 for the third embodiment. The above descriptions of component parts then also suffice for the following second and third embodiments.

Figure 4:
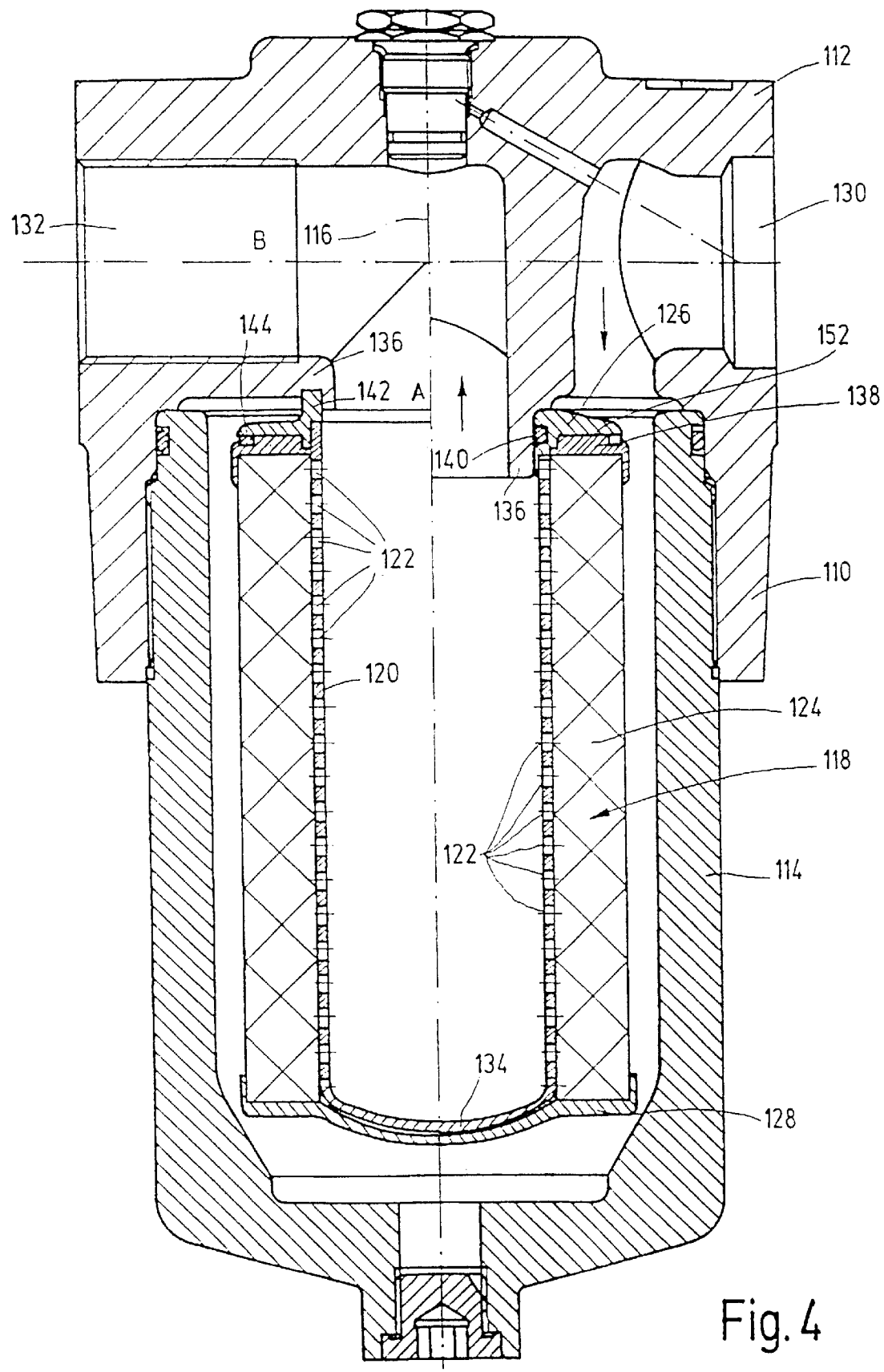
FIG. 4. is a side elevational view in section of a filter arrangement according to a second embodiment of the present invention.

In the second embodiment of FIG. 4, the base 134 closing off filter 118 at the bottom is formed of dished-end plate construction. The flexibly constructed bottom filter element mounting 128 facing and contacting dished-end plate base 134 is bevelled to fit with the dished-end plate base, and thus prevents transfer of damaging axial forces to the filter unit.

Figure 5:
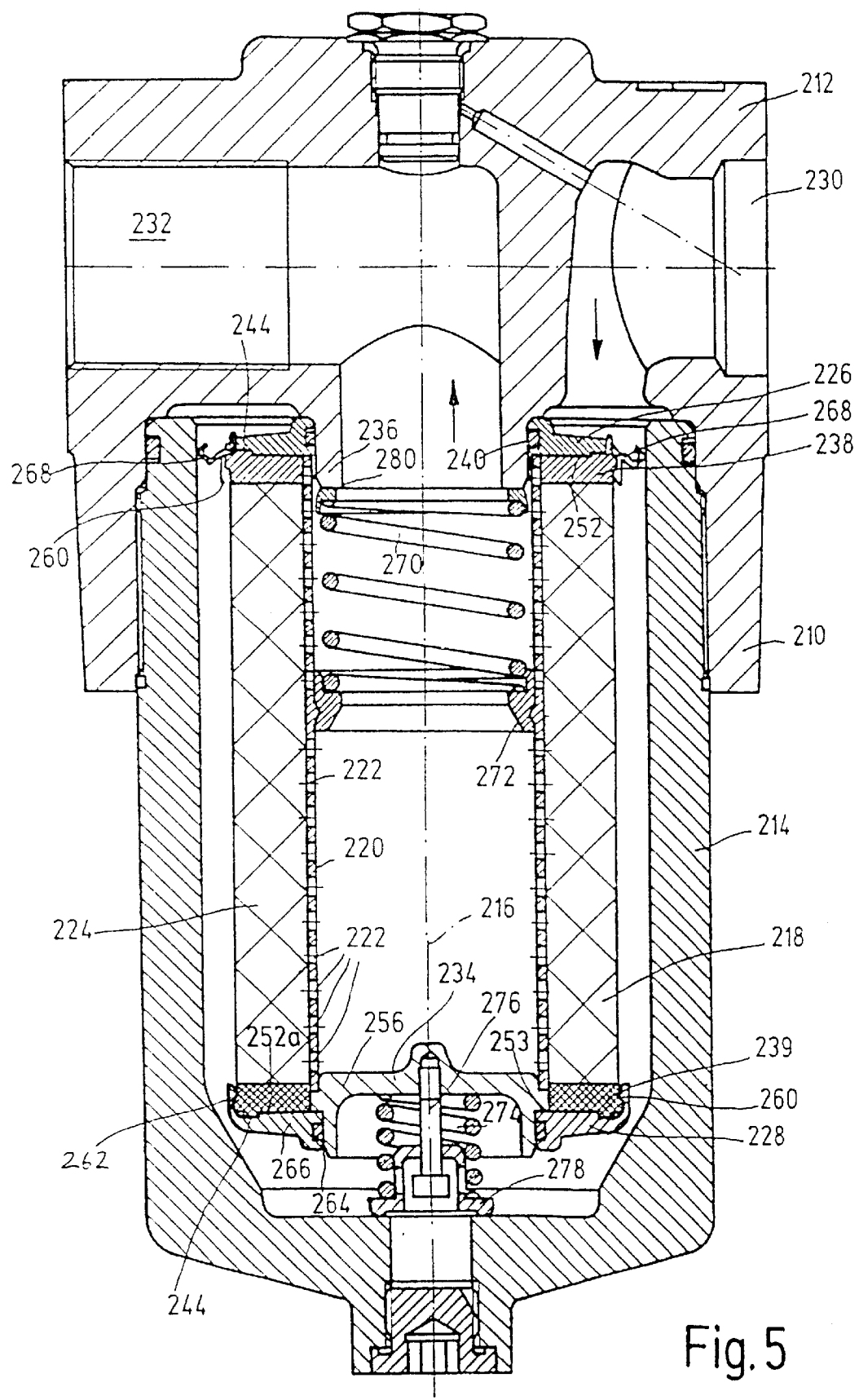
FIG. 5 is a side elevational view in section of a filter arrangement according to a third embodiment of the present invention.

In the third embodiment, now to be described relative to FIG. 5, the filter element mounting 226 connectable with filter head 212 incorporates cam drive elements 268. Under the effect of power sources, here in the form of spring elements, the cam drive elements can be brought into force-locking contact with filter pot 214 along its interior periphery. Because cam drive elements 268 form a sort of holding clamp arrangement, with only very slight relative movement between filter element 218 and filter pot 214, they can be removed from filter housing 210 together with the filter. Furthermore, cam drive elements 268 center filter element unit 218 within filtering pot 214.

Between support tube 220 and filter head 212, a power source 270 in the form of a compression spring is supported with its one end of the bottom of support 236 of filter head 212 and with its other end on an annular flange 272. Flange 272 is arranged in the interior of support tube 220 in its top third, and is securely connected with the support tube. Between filter pot 214 and filter element 218 another power source 274 is arranged. Power source 274 is in the form of a compression spring, and acts on the filter element mounting 228 remote from filter head 212 and particularly on its cover part 256. Cover part 256 is hollowed out in the third embodiment on its surface facing away from the interior of support tube 220. In the middle of the other power source 274, a holding rod 276 is screwed into cover part 256 and is arranged to be movable with its screw head with formation of a limiting boss in a housing part 278. Compression spring 274 is supported with its one end on cover part 256 and its other end on an annular flange of housing part 278. The maximum length of extension of compression spring 274 is limited by the screw head stop arrangement of holding rod 276.

For the mounting of the exchangeable filter element 218, this unit is first placed in filter pot 214, whereby the holding clamps or cam drive elements 268 center the unit in the middle of filter pot 214. The exchangeable filter element unit is supported on the base of filter pot 214 by means of housing part 278. Finally, filter pot 214 is screwed into filter head 212. As soon as exchangeable filter element 218 has reached the interior support 236 of filter head 212, this interior support will prebias the compression spring 270 by means of a guide ring 280, whereby the filter element mounting 226, seen at the top in FIG. 5, slides over supports 236 on the exterior periphery. A sealing is accomplished by means of O-ring 240. After the exchangeable filter element on filter head 211 has reached and is stopped by its limiting boss, compression spring 274 is prebiased by stretching over housing part 278 until filter pot 214 has reached the limiting boss in filter head 212.

In this cited position, the prebias force of compression spring 274 is greater than the prebias force of compression spring 270. Therefore, during operation, the filter element is prevented from being pressed away from filter head 212 by compression spring 270. Especially at times of increasing pressure load on filter 218 generated by the fluid to be filtered, the resulting compacting of the entire exchangeable filter element in axial direction would lead to damages to the filter assembly. The exchangeable filter element is disassembled in the reversed procedure, whereby first of all compression spring 274 is slackened. Instead of the multipart bottom filter element mounting 228, this mounting can also be constructed of one single piece. After detachment of top and bottom filter element mountings 226 and 228 from the aforementioned catch connection 260 and 262, filter mat 224 in turn can be exchanged together with annular intermediate spacing members 238 and 239 of the support tube 220 for an exchange of the filter mat.

As a result of the increase of sealing in the vicinity of the filter element mountings by means of the prebiasing producible as described as well as with the axial support of the filter element mountings, no damaging axial forces are transferred onto the filter unit as compared with the conventional filters and leakage in the high pressure area is also certainly avoided.

While various embodiments has been chosen to illustrate the invention, it will be understood by those skilled in the art that various changes and modifications can be made therein without departing from the scope of the invention as defined in the appended claims.

What is claimed is:
1. A filter arrangement, comprising:
a multi-part filter housing including a filter head detachably coupled to a filter pot; and
at least one filter element including
a support tube surrounded by a filter mat, said filter mat being open at opposite first and second ends thereof,
first and second filter element mountings mounted on said first and second ends of said filter mat, respectively, said first filter element mounting being securely connected with said support tube and releasably coupled to said filter head,
a first intermediate spacing member being coupled to said first end of said filter mat and being mounted between said first end of filter mat and said first filter element mounting, and
a first axial gap extending between said first intermediate spacing member and said first filter element mounting forming a first possible fluid passage point at said first filter element mounting, said gap being closed by fluid differential pressure generated after operation start-up of the filter arrangement.
2. A filter arrangement according to claim 1 wherein
a second intermediate spacing member is coupled to said second end of said filter mat and is mounted between said second end of said filter mat and said second filter element mounting; and
a second axial gap extends between said second intermediate spacing member and said second filter element forming a second possible fluid passage point at said second filter element mounting, said second gap being closed by said fluid differential pressure.
3. A filter arrangement according to claim 2 wherein
said second filter element mounting closes an end of said filter element remote from said filter head and surrounds said second intermediate spacing member in a cap-like manner.
4. A filter arrangement according to claim 3 wherein
said second filter element mounting is constructed of multiple parts which are connected to one another.
5. A filter arrangement according to claim 2 wherein
each of said intermediate spacing members and the respective filter element mounting are coupled by a catch coupling.
6. A filter arrangement according to claim 1 wherein
said first filter element mounting is releasably sealed to said filter housing.
7. A filter arrangement according to claim 1 wherein
said first filter element mounting is axially movable relative to and is radially biased against an internal support of said filter head.
8. A filter arrangement according to claim 1 wherein
said first intermediate spacing member overlaps said first end of said filter mat, and is connected with said first filter element mounting.
9. A filter arrangement according to claim 8 wherein
said first intermediate spacing member comprises an elastically flexible seal engaged with said first filter element mounting.
10. A filter arrangement according to claim 1 wherein
said first intermediate spacing member comprises an elastically flexible seal engaged with said first filter element mounting.
11. A filter arrangement according to claim 1 wherein
said first intermediate spacing member comprises at least an elastically flexible foam part.

12. A filter arrangement according to claim 11 wherein said foam is polyurethane foam or silicon foam.

13. A filter arrangement according to claim 1 wherein said first filter element mounting comprises cam driver elements forced into contact with said filter pot by a power source.

14. A filter arrangement according to claim 1 wherein a first power source is inserted between said support tube and said filter head.

15. A filter arrangement according to claim 14 wherein said first power source is a compression spring.

16. A filter arrangement according to claim 14 wherein a second power source is inserted between said filter pot and said filter element and acts on said second filter element mounting.

17. A filter arrangement according to claim 16 wherein said second power source is a compression spring.

18. A filter arrangement according to claim 1 wherein said filter mat is configured as a hollow cylinder; and a second intermediate spacing member is coupled to said second end of said filter mat and is mounted between said second end of said filter mat and said second filter element mounting.

19. A filter arrangement, comprising:

a housing including a filter head detachably coupled to a filter pot;

a tubular filter element including a perforated support tube surrounded by a filter mat, said filter mat being open at opposite first and second ends thereof;

first and second filter element mountings mounted on said first and second ends of said filter mat, respectively, said first filter element mounting being securely connected with an upper end of said support tube and contacting said filter head, said second filter element mounting being axially movable relative to a longitudinal axis of said support tube;

a base closing a lower end of said support tube and having an annular exterior shoulder, said base being sealed to said second filter element mounting, said shoulder engaging said second filter element mounting to limit axial movement thereof toward said filter head;

first and second resilient annular intermediate spacing members being coupled to said first and second ends of said filter mat, respectively, being removable therewith from said support tube when said support tube remains connected with said filter head, and being mounted between said first and second ends of filter mat and said first and second filter element mountings, respectively;

first and second axial gaps extending between said first and second intermediate spacing members and said first and second filter element mountings, respectively, forming possible fluid passage points at said filter element mountings, said gaps being closed by fluid differential pressure generated after operation start-up of the filter arrangement;

whereby said shoulder limits axial movement of said second filter element mounting towards said filter head limiting axial compression of said filter mat.

* * * * *